(12) United States Patent
Murar et al.

(10) Patent No.: US 6,818,305 B2
(45) Date of Patent: Nov. 16, 2004

(54) MOLDING METHOD AND METAL-COVERED COMPONENT FORMED THEREBY

(75) Inventors: Jason T. Murar, Clinton Township, MI (US); David J. Davis, Rocheser, MI (US)

(73) Assignee: Patent Holding Company, Fraser, MI (US)

( * ) Notice: Subject to any disclaimer, the term of this patent is extended or adjusted under 35 U.S.C. 154(b) by 0 days.

(21) Appl. No.: 10/242,206

(22) Filed: Sep. 12, 2002

(65) Prior Publication Data

US 2003/0008134 A1 Jan. 9, 2003

Related U.S. Application Data

(60) Division of application No. 09/528,761, filed on Mar. 17, 2000, which is a continuation-in-part of application No. 09/083,943, filed on May 22, 1998, now Pat. No. 6,428,738.

(51) Int. Cl.[7] ............................................. B32B 27/36
(52) U.S. Cl. .................. 428/412; 428/423.1; 428/423.3; 428/423.7; 428/424.2; 428/424.6; 428/424.7; 428/424.8; 428/425.8; 428/425.9; 428/457; 428/458; 428/461; 428/462; 428/463; 428/480; 428/483; 428/500; 428/522; 428/688; 428/689; 428/704
(58) Field of Search ............................. 428/412, 423.1, 428/423.3, 423.7, 424.2, 424.6, 424.7, 424.8, 425.8, 425.9, 457, 458, 461–463, 480, 483, 500, 522, 688, 689, 704

(56) References Cited

U.S. PATENT DOCUMENTS

| | | | |
|---|---|---|---|
| 3,740,918 A | 6/1973 | Meyer | |
| 3,934,385 A | 1/1976 | Paulus et al. | |
| 4,349,592 A * | 9/1982 | Nussbaum | 428/31 |
| 4,368,224 A * | 1/1983 | Jackson | 428/31 |
| 4,431,711 A | 2/1984 | Elsfeller | |
| 4,769,100 A | 9/1988 | Short et al. | |
| 4,902,557 A | 2/1990 | Rohrbacher | |
| 4,916,008 A * | 4/1990 | Katayama et al. | 428/205 |
| 4,952,351 A | 8/1990 | Parker et al. | |
| 4,999,227 A | 3/1991 | Vander Togt | |
| 5,247,018 A * | 9/1993 | Maeda et al. | 525/193 |
| 5,466,412 A | 11/1995 | Parker et al. | |
| 5,514,427 A * | 5/1996 | Ellison et al. | 428/31 |
| 5,529,336 A | 6/1996 | Eckhout | |
| 5,614,146 A | 3/1997 | Nakamura et al. | |
| 5,626,704 A | 5/1997 | Bowers, Jr. et al. | |
| 5,741,446 A | 4/1998 | Tahara et al. | |
| 6,082,762 A | 7/2000 | Preisler et al. | |
| 6,187,233 B1 | 2/2001 | Smith | |
| 6,413,630 B1 * | 7/2002 | Nakayama | 428/344 |
| 6,428,738 B1 | 8/2002 | Winget et al. | |
| 6,649,003 B1 * | 11/2003 | Spain et al. | 156/230 |

FOREIGN PATENT DOCUMENTS

| WO | WO9800277 | * | 1/1998 |
|---|---|---|---|
| WO | WO 98/51516 | | 11/1998 |

* cited by examiner

*Primary Examiner*—Rachel Gorr
(74) *Attorney, Agent, or Firm*—Brooks Kushman P.C.

(57) ABSTRACT

A molding method and a metal-covered plastic component such as partial or entire fascia, body side moldings, and the like, which have bright surface requirements and which includes a film sheet and a one-piece thermoplastic elastomeric structural carrier are provided. The film sheet includes a decorative layer of metal such as chrome. A plastic layer of the film sheet on which the layer of metal is formed is selected from a group consisting of polyester, polyurethane and polycarbonate. A bottom contact surface of the film sheet bonds with a front contact surface of the structural carrier by diffusion between the contact surfaces thereof within a mold cavity of an injection mold separate from the step of forming a preform which is securely positioned within the injection mold during injection molding to form the plastic part.

8 Claims, 2 Drawing Sheets

US 6,818,305 B2

MOLDING METHOD AND METAL-COVERED COMPONENT FORMED THEREBY

CROSS-REFERENCE TO RELATED APPLICATIONS

This application is a division of U.S. patent application Ser. No. 09/528,761, filed Mar. 17, 2000, which is a continuation-in-part of U.S. patent application Ser. No. 09/083,943, filed May 22, 1998, entitled "Method Of Manufacturing An In-Mold Laminate Component", now issued as U.S. Pat. No. 6,428,738.

TECHNICAL FIELD

This invention relates to molding methods and metal-covered parts formed thereby and, in particular, to molding methods and metal-covered plastic parts formed thereby which are adapted for use on motor vehicles such as partial or entire fascia, and body side moldings and the like which have bright surface requirements.

BACKGROUND ART

Many parts such as automotive parts are metal-plated after they are formed. The plating process requires elaborate facilities and consequently necessitates large expenses. For instance, significant square footage of a factory must be dedicated to such an environment for the plating of chrome on components such as those components used in the automotive industry, such as bumpers, bumper guards, side moldings, and the like. Moreover, certain metals have in recent years raised significant environmental concerns. As a result, such metals must be strictly monitored to satisfy environmental and safety regulations.

U.S. Pat. No. 5,626,704 discloses a composite automotive trim strip having a thermoplastic shell secured to the front of a support member.

U.S. Pat. No. 4,999,227 discloses an automotive bumper comprising a shell of injection molded plastic that is plated with chromium metal.

U.S. Pat. No. 5,741,446 discloses a method for producing a molded article, using a mold assembly having a cavity and an insert block formed of ceramic or glass.

U.S. Pat. No. 3,740,918 discloses a decorative trim strip comprising an elongate channel-shaped base molding having a vinyl or plastic decorative trim piece adhesively secured thereto.

U.S. Pat. No. 4,431,711 discloses a corrosion and abuse resistant plastic object that is vacuum metalized with a corrosion prone metal on a dielectric substrate.

U.S. Pat. No. 3,934,385 discloses a trim strip for an automotive body panel having a flexible plastic decorative covering secured to a core.

U.S. Pat. No. 4,902,557 discloses a method and apparatus for manufacturing a thermoplastic polyolefin composite useful as an exterior auto or truck body part. A polyester film is fed through a roll roller coater to apply first a clear coating and then a pigmented coating. A layer of thermoplastic chlorinated polyolefin provides intercoat adhesion of the pigmented layer to a polyolefin resin layer. In other words, a clear coat and then a color coat over the clear coat is applied to a polyester film in the form of Mylar. The resulting coated polyester film is then laminated to a thermoplastic polyolefin sheet. Then the polyester film is stripped off. The resulting face sheet is thermoformed into a shaped structure. This resulting face sheet does not include the stripped off polyester film.

U.S. Pat. No. 5,529,336 discloses a chromed or silvered applique and a plastic liner extruded onto the applique to form a sheet. The sheet is cut to form an applique member which is vacuum-formed. The vacuum-formed member is then insert molded with a plastic base.

U.S. Pat. No. 4,769,100 teaches a method of applying a carrier film pre-printed with metallic paint to an automobile body panel in a vacuum forming process. In other words, the carrier film is applied to automobile body panels in a vacuum forming process wherein a bottom surface of the carrier film is coated with a layer of adhesive.

U.S. Pat. Nos. 4,952,351 and 5,466,412 teach a method of manufacturing an air bag cover for an inflatable air bag system including a bondable film carrier, which is painted after the film carrier is molded.

However, the prior art fails to provide a method of manufacturing a metal-covered component wherein the step of plating the component after molding is eliminated and further where the component has the structural integrity both in terms of durability and strength to support varying applications including vehicle exterior applications.

DISCLOSURE OF INVENTION

This application is related to U.S. patent application Ser. No. 09/144,315, filed Aug. 31, 1998, entitled "Foil Covered Plastic Part and Method of Making Same", now issued as U.S. Pat. No. 6,280,823.

Another object of the present invention is to provide a molding method and a metal-covered plastic component formed thereby wherein molding scrap due to minor surface imperfections on the plastic can be reduced by completely covering the surface imperfections by the metal covering.

Yet still another object of the present invention is to provide a molding method and a metal-covered plastic component, such as a partial or entire fascia, body side moldings, and the like, wherein the component has increased durability yet has a bright surface.

In carrying out the above objects and other objects of the present invention a method is provided for manufacturing a metal-covered, molded plastic component. The method includes providing a film sheet having a decorative layer of metal. The film sheet is selected from the group consisting of polyester, polyurethane and polycarbonate. The method further includes forming the film sheet to obtain a preform, and placing the preform in a mold cavity of an injection mold having a shape defining the desired plastic component. The method also includes injecting a thermoplastic elastomer into the mold cavity of the injection mold to generate a structural carrier for the preform. The generation of the structural carrier creates sufficient pressure and heat to bond the structural carrier to a bottom surface of the preform to form the metal-covered molded plastic component. The method finally includes preventing the preform from moving in the mold cavity during the step of injecting.

Preferably, the thermoplastic elastomer is selected from the group consisting essentially of a thermoplastic polyolefin, thermoplastic urethane, polyester, polycarbonate, acrylonitrile/butadiene/styrene, polypropylene, lomod, bexloy, a mixture of acrylonitrile/butadiene/styrene and polycarbonate, and mixtures thereof.

Also, preferably, the step of injecting a thermoplastic elastomer into the mold cavity occurs at a temperature of approximately 420° F. and at a pressure of 50 psi to 15,000 psi.

The method may include the step of cutting the preform prior to the step of placing.

The structural carrier may have a flexural modulus in the range of 15,000 to 400,000 psi.

The structural carrier may have a durometer in the range of 15 Shore D to 100 Shore D.

The film sheet preferably has a total thickness of approximately 0.2 mils.

Further in carrying out the above objects and other objects of the present invention, a method of manufacturing a metal-covered, molded laminate automotive component is provided. The method includes inserting a film sheet having a decorative layer of metal into a forming station to form the film sheet into a predetermined automotive component shape to create a formed film sheet having top and bottom surfaces. The film sheet is selected from the group consisting of polyester, polyurethane and polycarbonate. The method further includes placing the formed film sheet in a mold cavity of an injection mold having a shape defining the automotive component. The method also includes injecting a thermoplastic elastomer into the mold cavity of the injection mold, such that the thermoplastic elastomer is in mating contact with the bottom surface of the formed film sheet, to generate a structural carrier for the formed film sheet. The generation of the structural carrier creates sufficient pressure and heat to bond the structural carrier to the bottom surface of the formed film sheet to form the metal-covered, molded laminate automotive component. The preform is prevented from moving in the mold cavity during the step of injecting.

Still further in carrying out the above objects and other objects of the invention, a method of manufacturing a metal-covered, molded plastic component is provided. The method includes providing a film sheet having a decorative layer of metal. The film sheet is selected from the group consisting of polyester, polyurethane and polycarbonate. The method further includes forming the film sheet to obtain a preform and placing the preform in a mold cavity of an injection mold having a shape defining the desired plastic component. The method also includes injecting a thermoplastic elastomer into the mold cavity of the injection mold to generate a structural carrier for the preform. The generation of the structural carrier creates sufficient pressure and heat to bond the structural carrier to the bottom surface of the preform to form the molded laminate plastic component wherein the decorative layer of metal is coated with polyvinylidine fluoride and a clear plastic layer.

The polyvinylidine fluoride may comprise more than 50% of the total thickness of the film sheet.

The thermoplastic elastomer may be selected from the group consisting of a thermoplastic polyolefin, thermoplastic urethane, polyester, polycarbonate, acrylonitrile/butadiene/styrene, polypropylene, a mixture of acrylonitrile/butadiene/styrene and polycarbonate, and mixtures thereof.

The step of injecting a thermoplastic elastomer into the mold cavity may occur at a temperature of approximately 420° F. and at a pressure of 50 psi to 15,000 psi.

The method may include the step of cutting the preform prior to the step of placing.

The structural carrier may have a flexural modulus in the range of 15,000 to 400,000 psi.

The structural carrier may have a durometer in the range of 15 Shore D to 100 Shore D.

The film sheet may have a total thickness of approximately 0.2 mils.

Still further in carrying out the above objects and other objects of the invention, a method of manufacturing a metal-covered, molded laminate automotive component is provided. The method includes inserting a film sheet having a decorative layer of metal into a forming station to form the film sheet into a predetermined automotive component shape to create a formed film sheet having top and bottom surfaces. The film sheet is selected from the group consisting of polyester, polyurethane and polycarbonate. The method further includes placing the formed film sheet in a mold cavity of an injection mold having a shape defining the automotive component. The method also includes injecting a thermoplastic elastomer into the mold cavity of the injection mold, such that the thermoplastic elastomer is in mating contact with a bottom surface of the formed film sheet to generate a structural carrier for the formed film sheet. The generation of the structural carrier creates sufficient pressure and heat to bond the structural carrier to the bottom surface of the formed film sheet to form the molded laminate automotive component. The decorative layer of metal is coated with a layer of polyvinylidine fluoride and a clear plastic layer.

The polyvinylidine fluoride may comprise more than 50% of the total thickness of the film sheet.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

While the examples and figures provided herein refer to automotive plastic components, this invention has substantial application in other areas and is thus intended to have broader scope than the cited representative examples. In essence, this invention can be used with any application calling for a plastic component having bright surface requirements such as partial or entire fascia, body side moldings, or the like.

Figure 1:
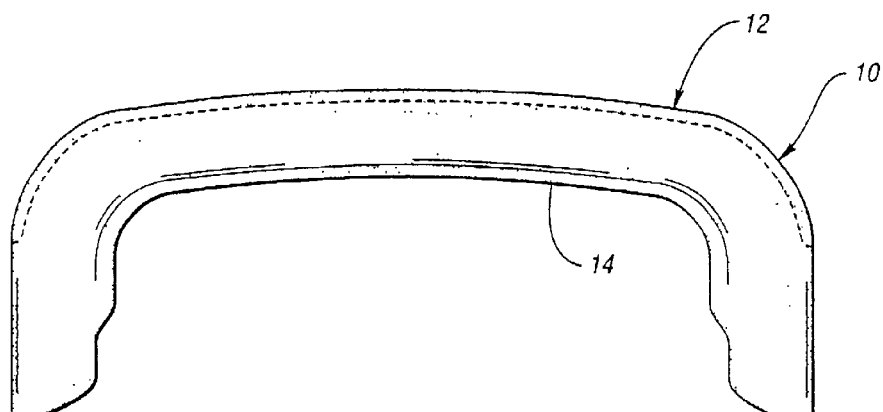
FIG. 1 is a top plan view of a plastic component in the form of a fascia manufactured in accordance with the present invention and adapted to be mounted on an automotive vehicle.

Referring now to the drawing figures, there is illustrated in FIG. 1 a top plan view of one type of fascia, generally indicated at 10, adapted to be mounted on an automobile.

Figure 4:
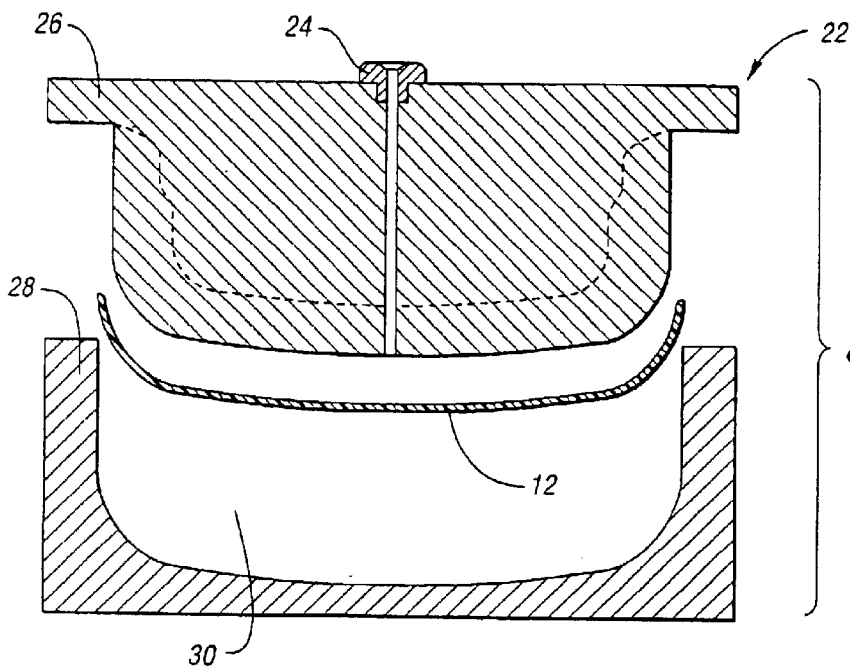
FIG. 4 is a schematic view, partially broken away and in cross section, of a conventional injection mold which may be utilized to make plastic components of the present invention; the mold is depicted in an open position with the preform placed between two halves of the mold.
Figure 5:
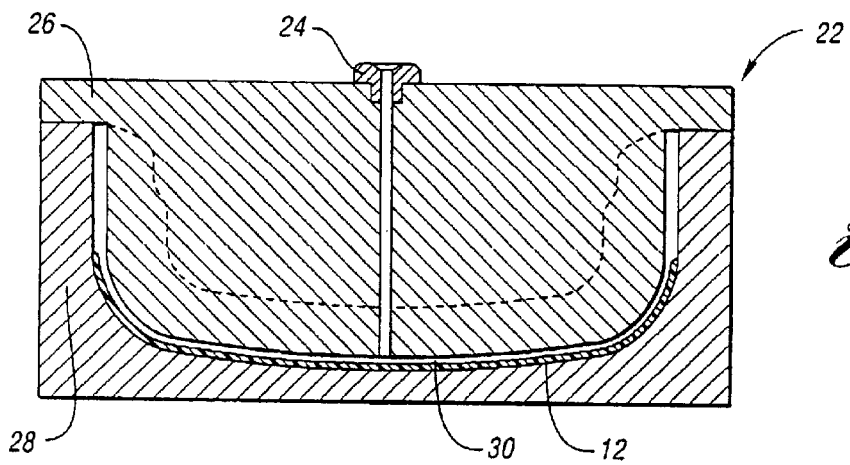
FIG. 5 is a schematic view of the mold of FIG. 4 in a closed position, with the preform held at a predetermined location in a mold cavity defined by two halves of the mold.
Figure 6:
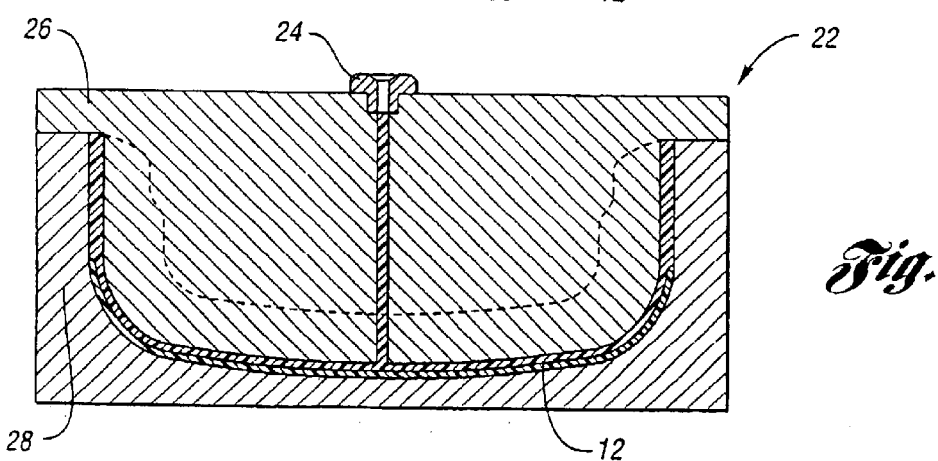
FIG. 6 is a schematic view of the mold of FIG. 4 depicting the mold cavity with the molten resin injected therein to form the structural carrier for the preform thereby resulting in the metal-covered component.

The fascia 10 includes a one-piece outer layer or preform 12, composed of a film sheet, preferably a film sheet having a decorative layer of metal such as chrome, which is thermoformed from a material compatible with a fascia body or structural carrier 14, which is preferably injection molded in an injection mold 22 as illustrated in FIGS. 4-6. The fascia body 14 is preferably composed of a thermoplastic elastomer. The elastomer of the fascia body or structural carrier 14 should be compatible with the outer layer 12 so that a bottom contact surface of the outer layer 12, mounts with the front contact surface of the fascia body 14 by diffusion between the surfaces thereof in the injection mold 22 to prevent the fascia body 14 from separating from the outer layer 12 during use of the fascia 10.

The outer layer 12 includes a film sheet that has a decorative layer of shiny metal such as chrome preformed thereon. The film sheet is preferably a polyester sheet such as Mylar®, a polyurethane or polycarbonate sheet.

Figure 3:
FIG. 3 is a side view of a thermoformed preform prior to insertion into an injection mold.

As shown in FIG. 3, in the preferred embodiment, the outer layer 12 includes a film sheet with the following coatings or layers placed thereon, a decorative layer of metal such as chrome in mating contact with the film sheet to form a film 16 and a layer 18 of polyvinylidine fluoride (PVDF) (i.e., Tevlar®) with a clear coat 20 to protect the film 16 from damage and to provide film elasticity, chemical resistance, stain resistance, weathering and UV protection. The clear coat 20 may be a polyethylene or a polyvinylchloride which is slightly "sticky" to provide friction to prevent movement of a preform within the mold 22 during injection molding. In the most preferred embodiment, PVDF comprises 72% of the total thickness of the outer layer 12 which is approximately 0.2 mils.

The thermoplastic elastomer of the fascia body or structural carrier 14 is preferably a thermoplastic elastomer such as a thermoplastic polyolefin, thermoplastic urethane, polyester, polycarbonate, a mixture of polycarbonate and ABS (acrylonitrile/butadiene/styrene) or similar material.

For other automotive applications, the carrier 14 is varied to accommodate the intended use. Accordingly, for bumper/fascia applications, the structural carrier 14 can be selected from at least the following materials: lomod®, bexloy® and thermoplastic polyolefin. For cluster bezel applications, the structural carrier 14 can be selected from at least the following materials: ABS (acrylonitrile/butadiene/styrene), a mixture of polycarbonate and ABS, polycarbonate, and polypropylene.

The durometer and elastic or flex modulus of the materials also vary depending on the desired stiffness of the component. Typically, the durometer of the fascia body 14 will be in the range of about 20 Shore D to 100 Shore D, while the flexural modulus will be in the range of about 15,000 to about 400,000 psi. Also, typically, the durometer of the outer layer 12 will be in the range of about 15 Shore A to 100 Shore A. These ranges of course vary depending on the desired plastic component to be manufactured and are only illustrative of one example.

Figure 2:
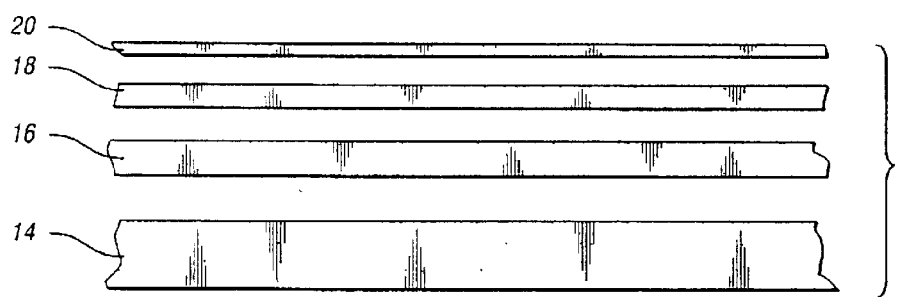
FIG. 2 is a broken-away view of the various layers of the fascia separated to illustrate the layers and wherein the thicknesses of the layers are not to scale.

As depicted in FIG. 2, a sectional, partially broken-away view of the layers of the fascia 10 of FIG. 1 is shown. The fascia body or structural carrier 14 supports the outer layer 12 which has the film 16 placed thereon, followed by the PVDF layer 18, and a clear plastic coat 20, preferably a PE (polyethylene) protective layer or a polyvinylchloride clear coat, both of which are slightly "sticky" to prevent movement of the preform 12 within the mold cavity 20.

Referring now to FIG. 4, there is illustrated the conventional plastic injection mold 22 for making a plastic component pursuant to the present invention. Briefly, with the injection mold 22 there is included a sprue 24 for injecting predetermined amounts or shots of molten resin. The one-piece outer layer 12 is initially vacuum molded or thermoformed to form the curved preform 12. Opposing surfaces of male and female mold halves 26 and 28, respectively, of the mold 22 define a mold cavity 30 into which the preform 12 is placed.

As illustrated in FIG. 5, there is a depiction of the one-piece preform 12 created from the vacuum molded or thermoformed film sheet which was first placed in the mold cavity 30 as illustrated in FIG. 4. The preform 12 is preferably secured to the mold half 28 within the mold cavity by either an adhesive, tape, or by applying a vacuum to the mold half 28. An adhesive coated on the clear coat 20 stabilizes the preform 12 in the cavity 30 as plastic material flows over the preform 12 to produce the substrate or carrier 14 and thus the fascia 10.

Thereafter, as depicted in FIG. 6, the fascia body or structural carrier 14 is molded in the plastic injection mold 22 to form the completed unitary laminate plastic component 10. The plastic flow does not disrupt the position of the preform 12 in the cavity 30. The lower mold half 28 may have style lines formed therein and the preform 12 may have a curl design at its edges to prevent the preform 12 from catching the plastic flow and thereby disturbing the position of the preform 12.

The body 14 of the fascia 10 may also be formed from thermoplastic polyolefin, polycarbonate, tee tpe, sebs tpe, and a mixture of polycarbonate and acrylonitrile/butadiene/styrene (ABS). The corresponding film sheet 12 must be compatible with the plastic of the body 14 so that diffusion between contact surfaces occurs. Additionally, the laminate should be compatible with the substrate on which the laminate is to be adhered. In general, this requirement is achieved by selecting a structural carrier 14 with at least one or more materials common to the substrate on which the laminate is to be adhered. As an example, with a thermoplastic polyolefin substrate, the structural carrier should include polypropylene.

In an alternative embodiment, the mold can be modified to produce a plastic component with embossed lettering. This embossed effect is achieved by etching into the mold the desired pattern or letters so that the letters have at least a 0.5 mm radius on the edge of the letter, or else the film will tear and stretch.

The unique features of the laminate plastic components are 1) a stiff inner material to support the intended application; 2) reduction and/or elimination of metal plating problems; 3) reduced molding scrap due to splay, flow marks and minor surface imperfections, which can be completely covered; and 4) increased durability of the resulting plastic laminate components.

It should be understood that the film sheet can be positioned in the injection mold either by way of a preform, as described above, or by way of a film roll supply. In this way, one can mold in the decorative metal layer at the press or mold thereby avoiding a secondary plating operation.

While the best mode for carrying out the invention has been described in detail, those familiar with the art to which this invention relates will recognize various alternative designs and embodiments for practicing the invention as defined by the following claims.

What is claimed is:

1. A metal-covered, molded plastic component comprising:
   a preform including a film sheet having a decorative layer of metal, the film sheet being selected from the group consisting of polyester, polyurethane and polycarbonate that is placed into a mold cavity of an injection mold having a shape defining the desired plastic component; and
   a structural carrier made from a thermoplastic elastomer that is injected into the mold cavity of the injection mold and bonded to a bottom surface of the preform to form the molded laminate plastic component wherein the decorative layer of metal is coated with polyvinylidine fluoride and a clear plastic layer.

2. The component of claim 1, wherein the polyvinylidine fluoride comprises more than 50% of the total thickness of the film sheet.

3. The component of claim 1, wherein the thermoplastic elastomer is a thermoplastic polyolefin.

4. The component of claim 1, wherein the structural carrier has a flexural modulus in the range of 15,000 to 400,000 psi.

5. The component of claim 1, wherein the structural carrier has a hardness durometer in the range of 15 Shore D to 100 Shore D.

6. The component of claim 1, wherein the film sheet has a total thickness of approximately 0.2 mils.

7. A metal-covered, molded laminate automotive component comprising:
   a formed film sheet having a decorative layer of metal, the formed film sheet having top and bottom surfaces, the filmed film sheet being selected from the group consisting of polyester, polyurethane and polycarbonate that is placed into a mold cavity of an injection mold having a shape defining the desired plastic component; and
   a structural carrier made from a thermoplastic elastomer that is injected into the mold cavity of the injection mold and bonded to the structural carrier to the bottom surface of the formed film sheet to form the molded laminate automotive component wherein the decorative layer of metal is coated with a layer of polyvinylidine fluoride and a clear plastic layer.

8. The component of claim 7, wherein the polyvinylidine fluoride comprises more than 50% of the total thickness of the film sheet.

\* \* \* \* \*